Figure 1:
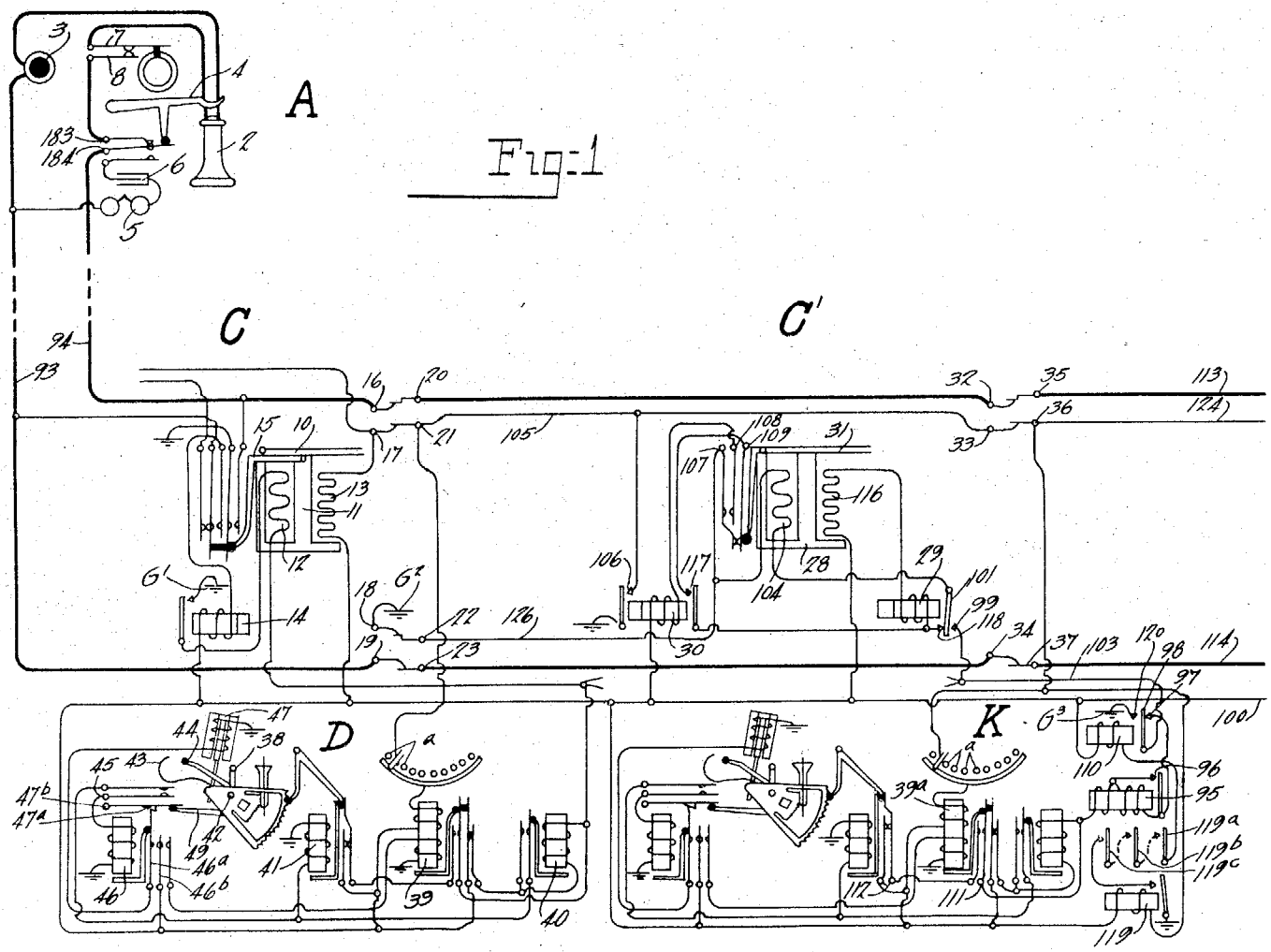

Aug. 28, 1923. Re. 15,682

W. T. POWELL

AUTOMATIC TELEPHONE SYSTEM

Original Filed Feb. 26, 1914 4 Sheets-Sheet 1

Inventor
Winfred T. Powell
Chas. M. Candy. Atty.

Aug. 28, 1923. Re. 15,682

W. T. POWELL

AUTOMATIC TELEPHONE SYSTEM

Original Filed Feb. 26, 1914 4 Sheets-Sheet 2

Inventor
Winfred T. Powell
Chas. M. Candy Atty.

Aug. 28, 1923. Re. 15,682

W. T. POWELL

AUTOMATIC TELEPHONE SYSTEM

Original Filed Feb. 26, 1914 4 Sheets-Sheet 3

Inventor
Winfred T. Powell
Chas. M. Candy Atty.

Aug. 28, 1923. Re. 15,682

W. T. POWELL

AUTOMATIC TELEPHONE SYSTEM

Original Filed Feb. 26, 1914 4 Sheets-Sheet 4

Inventor
Winfred T. Powell
Chas. M. Landy Atty

Reissued Aug. 28, 1923. Re. 15,682

UNITED STATES PATENT OFFICE.

WINFRED T. POWELL, OF ROCHESTER, NEW YORK, ASSIGNOR TO AUTOMATIC ELECTRIC COMPANY, OF CHIGAGO, ILLINOIS, A CORPORATION OF ILLINOIS.

AUTOMATIC TELEPHONE SYSTEM.

Original No. 1,306,827, dated June 17, 1919, Serial No. 821,192, filed February 26, 1914. Application for reissue filed September 10, 1920. Serial No. 409,480.

*To all whom it may concern:*

Be it known that I, WINFRED T. POWELL, a citizen of the United States of America, and resident of Rochester, Monroe County, New York, have invented certain new and useful Improvements in Automatic Telephone Systems, of which the following is a specification.

My invention relates to improvements in automatic telephone systems and relates particularly to certain features whereby the efficiency of the operation of such systems is greatly increased.

Among the objects of my invention are the provisions of primary and secondary line switches which are controlled by master switches, but which master switches do not preselect trunks, as has heretofore usually been the case, but on the contrary these master switches are so arranged that they select the trunk for use in any call at the time when that call is initiated. These master switches are of the reciprocating type and control a group of line switches which are normally engaged with the master switch shaft. The master switches normally hold the line switches in a position opposite a trunk. If, when a call is initiated, this trunk is idle, the line switch of the calling subscriber connects with that trunk without necessitating any movement on the part of the master switch. However, if the trunk is busy, the master switch then operates to select an idle trunk, and when this trunk is selected, the line switch of the calling line connects with this idle trunk.

Further features of my invention relate to the use of primary and secondary line switches of this character as traffic distributors—that is, for the purpose of distributing calls to an operator's board. Provision is made whereby, when an operator is busy, all trunks leading to that operator's position will be made busy in order to prevent a second call coming to that board while the operator is busy. With the old arrangement of master switches, each time that an operator's position was thus made busy, all the master switches were moved from the trunks leading to that operator's position on to trunks leading to an idle operator's position. With my new arrangement, however, the master switches are not moved off the trunks leading to a busy operator's position unless a subscriber in the group controlled by one of these master switches initiates a call during this period. I thus save a great deal of wear and tear due to any unnecessary operation of these master switches.

A further object of my invention relates to means for preventing a subscriber of any one of the groups from connecting through the primary line switch with any one of the secondary line switches while the master switch which controls the primary switches is rotating. In this manner I avoid the possibility of two subscribers seizing the same trunk.

A further object of my invention is the provision of a selecting switch through which connection may be made with a trunk line from either one of two levels. If, however, connection is made with this trunk line from one level, the connection is then extended from this trunk line through one automatic switch, while if connection is extended to this trunk line from the other level of this selecting switch, the connection is then extended from that trunk line through a second automatic switch.

Further objects of my invention relate to certain improvements in the various switches employed, all of which will be more readily understood by reference to the accompanying drawings, in which I have illustrated my invention in connection with an automatic telephone system embodying automatic switches of well-known types.

Figure 2:
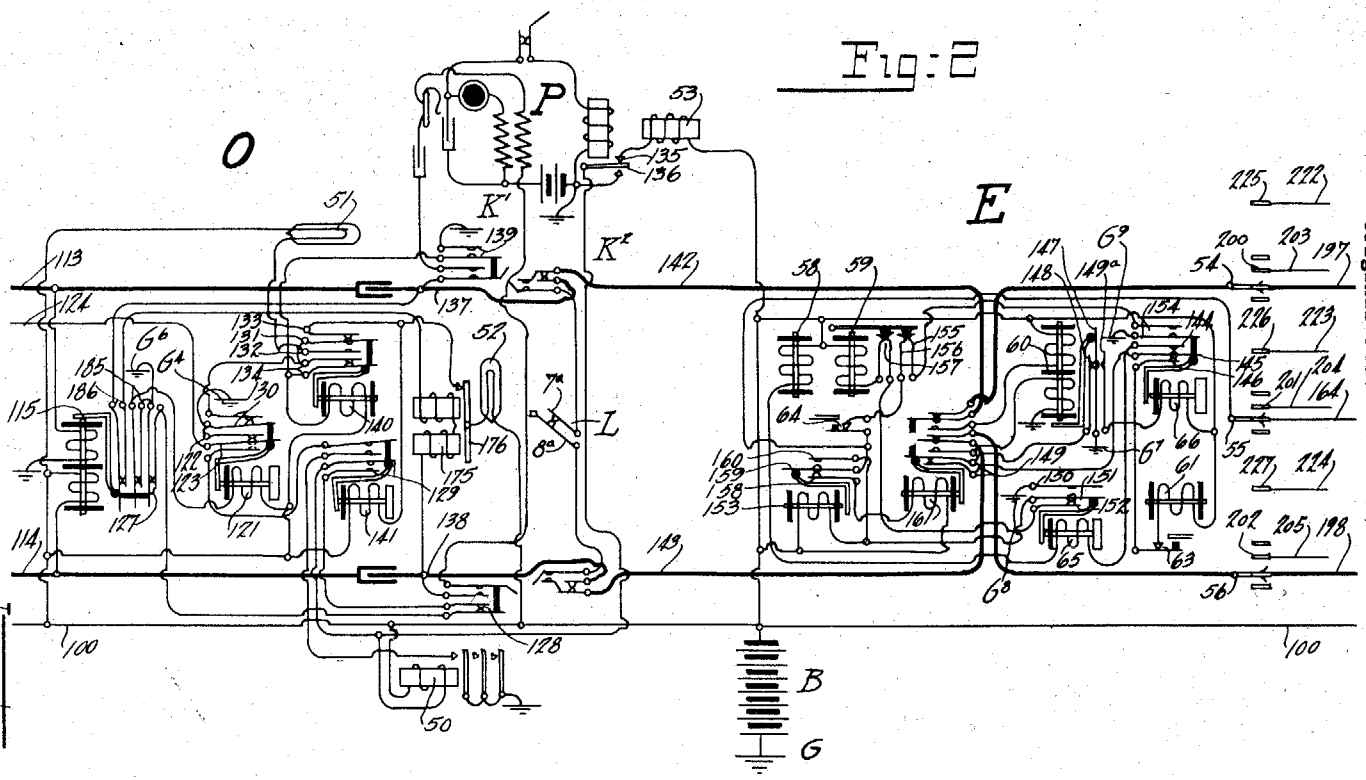
Figure 4:
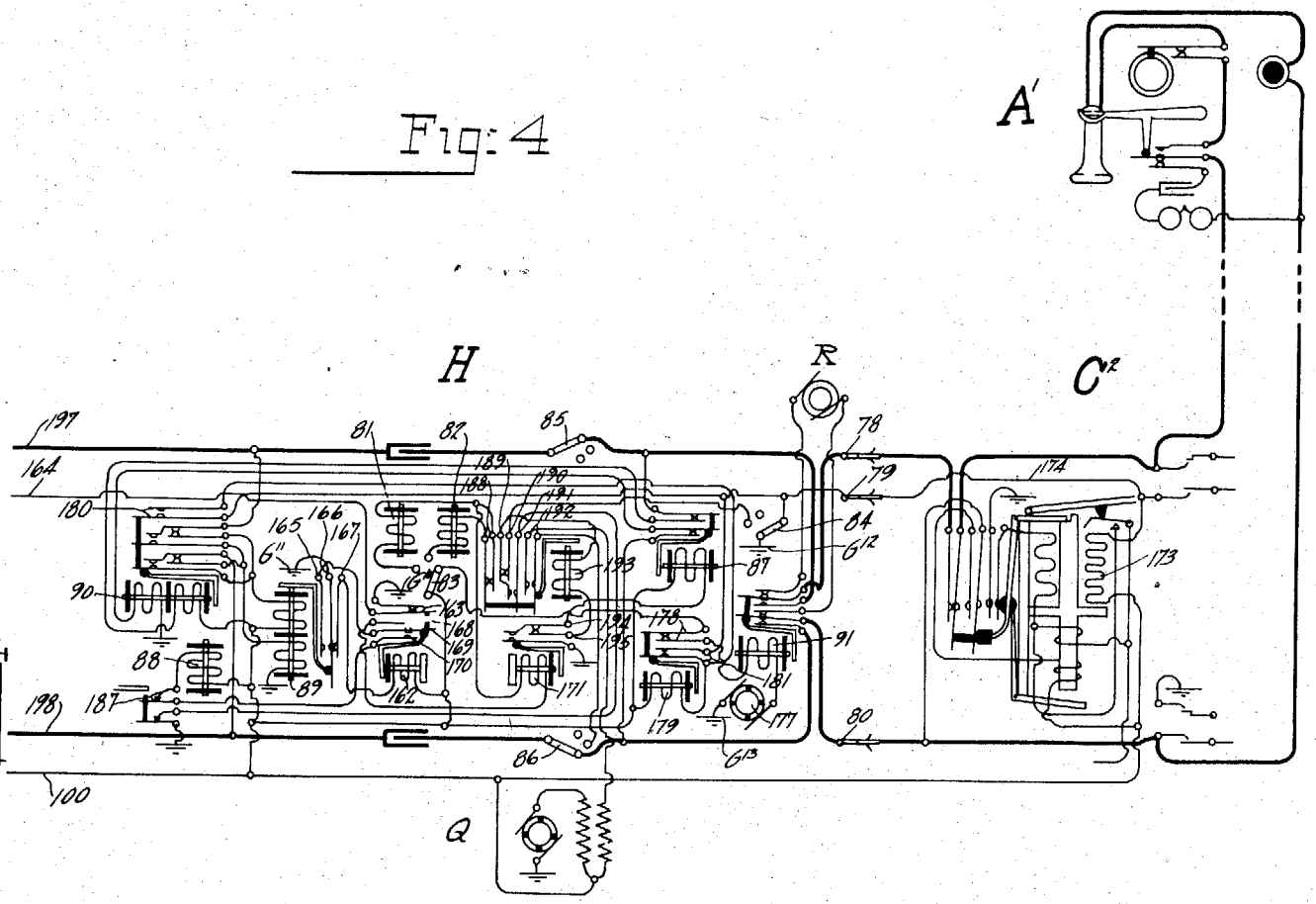

Figures 1, 2 and 4 taken together show a complete circuit connection between a calling subscriber A′ and a called subscriber A″, the lines of both terminating in the same branch exchange. The said connection is completed through the medium of the individual switch C, the secondary switch C′, the operator's cord circuit O at a manual board, the first selector E and the connector H to the substation A′.

Figure 3:
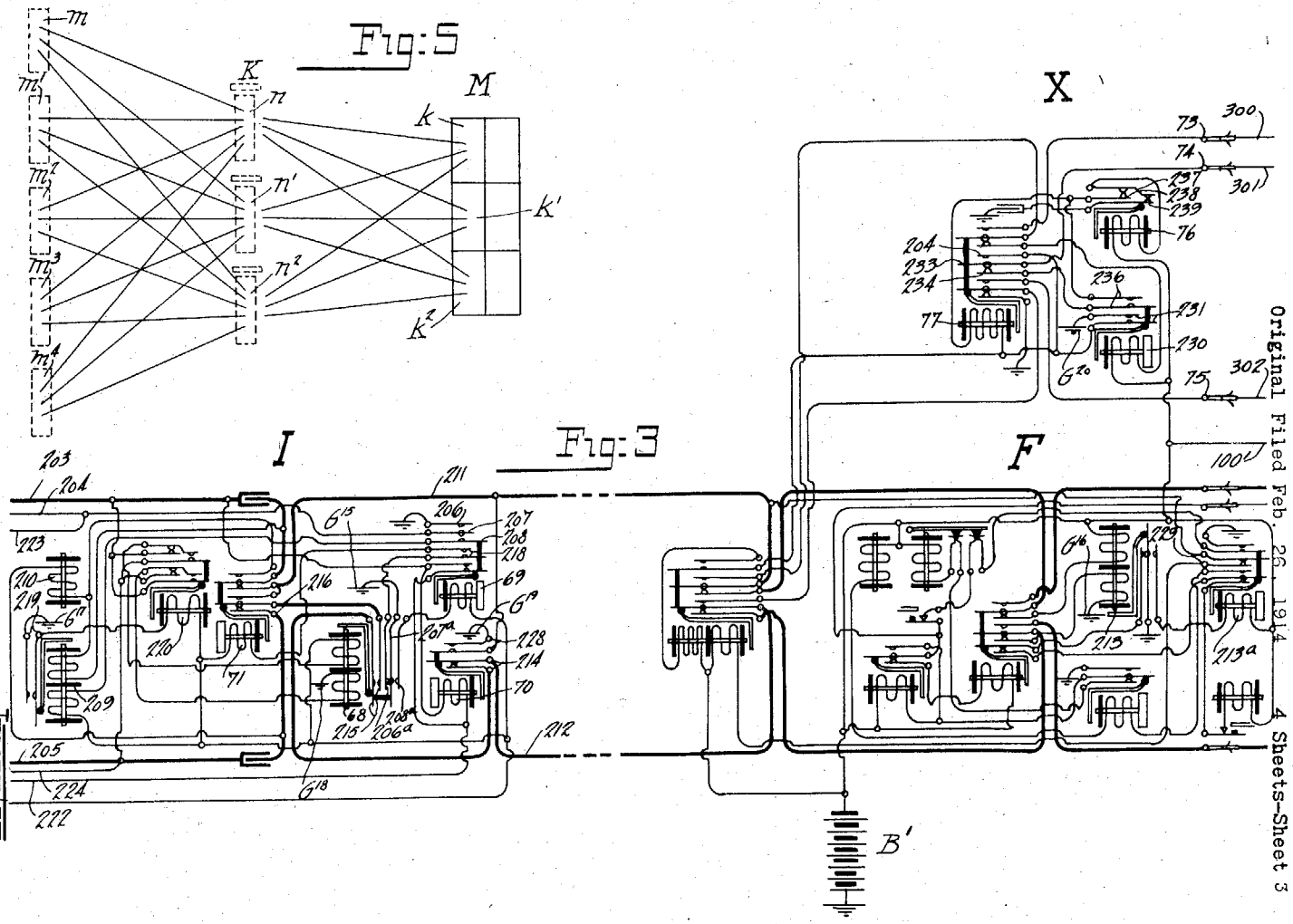

Considering Figs. 1, 2 and 3 and apparatus similar to that shown in Fig. 4, a complete circuit connection is shown between a calling subscriber A and a called subscriber (not shown) in a distant or main exchange. The said connection is completed through the medium of primary and secondary line switches C and C′, an operator's cord circuit O, first selector E, repeater I, second selector F and a connector switch (not shown) similar to the connector H to the called substation in the said second exchange.

Fig. 5 is a diagrammatic view showing the manner in which the primary and secondary switches are grouped and the trunking connections for extending connection to an operator's board.

The individual switches C of all the lines in the system are arranged in groups *m*, *m'*, etc., usually one hundred in a group, each group having common access to a small number of trunk lines which lead to secondary switches C'. These secondary switches arranged in groups *n*, *n'*, etc., like the primary switches, each group having access to a plurality of operators' positions *k* at the manual board M. The trunks leading from any one primary board do not lead to any one secondary board, but are distributed over a plurality of secondary boards. Likewise, the trunks leading from any one secondary board do not lead to any one operator's position, but are distributed over a plurality of operators' positions at the manual board M.

The automatic substations A and A' may be of any suitable or approved type. Referring to the substation A, it comprises the usual receiver 2, transmitter 3, switch-hook 4, ringer 5 and condenser 6. It is also provided with an automatic calling device represented diagrammatically by a pair of impulse springs 7 and 8 and an impulse wheel 9, which latter may be controlled by the subscriber through the medium of a dial (not shown) provided with finger holes, in a well-known manner. The calling device may be similar to that shown and described in British patent to S. G. S. Dicker No. 29,654 of 1910.

The primary line switch C is of the general type of line switch shown in British patent to R. W. James No. 26,301 of 1906, the particular form shown, however, being similar to that shown in British patent to T. G. Martin No. 1419 of 1910, with the exception that the line relay and operating magnet are made separate instead of being combined in a single structure. Among other details, the line switch comprises a plunger (not shown) carried upon the end of a plunger arm 10, which latter is adapted, when the plunger arm is attracted by the magnet 11, to be thrust into some one of a plurality of groups of contact springs 16, 20, 17, 21, 18, 22, 19 and 23, to force them into contact in pairs as indicated. The magnet 11 also controls the cut-off armature 15 and comprises two windings, namely, the pull-in winding 12 and the cut-off winding 13. The winding 12 is strong enough to operate both the plunger arm 10 and the cut-off armature 15, while the winding 13 is only strong enough to operate the cut-off armature 15 and to hold the plunger arm 10 in an operated position after it has once been operated. The circuit of the pull-in winding 12 is controlled by the line relay 14, which is slow acting—that is, slow to deenergize after its energizing circuit has been broken, so that it may keep the operating winding 12 energized for a short time after the cut-off armature 15 has operated to disconnect said line relay 14 from the line. Although only one set of springs (16—23) is shown, each line switch is provided with a plurality of such sets, each set forming the terminal of a trunk line leading to a secondary line switch C'. Each trunk line is connected in multiple with the corresponding springs of all the line switches of the group which is controlled by the master switch D. The plungers of the non-numerical switches C and C' are preferably of the self-aligning type, i. e., the plungers always return to normal engagement with the master switch shaft as soon as the plunger leaves the bank.

The secondary line switch C' is similar to the primary line switch C. It comprises an operating magnet 28 having an operating winding 104 and a hold-in winding 116. Connected in series with the winding 116 is an auxiliary relay 29. The operating magnet 28 controls the circuit for a second auxiliary relay 30. These two auxiliary relays 29 and 30 are slow acting, i. e., slow to deenergize after their energizing circuits have been broken. The line switch C' is also equipped with a plunger (not shown) and a plurality of sets of bank contacts, only one set (32 to 37, inclusive) of which is shown. The master switch K controls the group of line switches to which the switch C' belongs in the same manner that the master switch D controls the group of primary line switches to which the line switch C belongs.

The master switch D is of the same general type as that disclosed in British Patent No. 26,301 of 1906, referred to above, being however, of the particular type disclosed in French Patent No. 449,234 of 1912, the circuits, however, being somewhat modified to adapt the switch to operate in a system embodying the principles of my invention. This master switch differs from that disclosed in said French patent in that it does not preselect, i. e., it does not retain the plungers of all the idle line switches in front of an idle trunk, but, rather, it operates to select an idle trunk after a call has been initiated. If the said master switch is already standing opposite an idle trunk when a call is initiated, it will fail to operate, but if said master switch is standing opposite a busy trunk, it will operate to seek an idle trunk after the call is initiated.

In general, the operation of the master switch is as follows: It will be assumed that the master switch is standing opposite an idle trunk line. Whenever a line switch whose plunger is in engagement with the plunger shaft 38 is operated to seize a trunk line, a circuit will be closed from ground on the trunk-release conductor through the upper winding of the relay 39. The relay 39, upon energizing, throws the relay 40 into the circuit which feeds current to all the pull-in windings 12 of all the line switches C that are controlled by the master switch D. The relay 39 continues to remain energized as long as the line switch C is operated, or until another subscriber tries to call. If another call is now initiated, the coil 40 prevents the pull-in winding of the line switch attempting to call from receiving sufficient current to cause the operation of that switch. The relay 40 energizes, however, and, upon energizing, will close a circuit through the relay 41. The relay 41, upon energizing, unlocks the shaft 42. The spring 43 thereupon operates to rotate said shaft to cause the plunger shaft to move the idle plungers away from said busy trunk line and onto an idle trunk line. When the idle trunk line is reached, the circuit to ground through the master switch wiper is broken and the relay 39 deenergizes. The pull-in winding of the said line switch then receives sufficient current to operate and causes the said line switch plunger to plunge in upon said idle trunk. When the relay 39 deenergizes it breaks the circuit of the relay 40, which in turn breaks the circuit of the relay 41, returning these relays to normal position. When the plungers in their operations pass beyond the last trunk line, the arm 44 forces the springs 45 into contact, whereupon the relay 46 is energized and closes the circuit of the solenoid 47 through the contact springs $46^a$ and $46^b$ and the lower winding of the relay 39. The contact spring $46^a$ is locked in operated position by means of the catch $47^a$ on the spring $47^b$. The solenoid, upon energizing, rotates the shaft back to its initial position, so as to bring all the plungers which are in engagement with the plunger shaft back to a position opposite the first trunk line and to restore the tension of the spring 43. When the plunger shaft reaches its initial position, the arm 49 strikes the spring $47^b$ and thus unlocks the springs $46^a$ and $46^b$ of the relay 46, which permits the solenoid and the relay 39 to deenergize and the plunger shaft to come to rest.

The master switch K is similar to the master switch D except that it is provided with certain additional relays. These comprise the relay 95, which is adapted to be connected in series with the pull-in windings 104 of the various line switches of that group. This relay is connected through the back contacts 97 and 98 of the group busying relay 110, the circuit of which relay includes a chain of contacts $119^a$, $119^b$, $119^c$, etc., controlled by a relay similar to the relay 119, there being one such relay for each trunk leading from the secondary board *n*.

The operator's cord circuit O is provided with the line relay 115 bridged across the answering end of the cord and the polarized relay 175 bridged across the calling end, which controls a back supervisory lamp 52. A slow acting relay 121 and a second relay 140 are likewise provided, which relays cooperate in controlling the operation of the call signal lamp 51. A relay 141 is likewise provided, which cooperates with the relay 50 for placing ground on the release trunk 124. The relay 50 is a group busying relay—that is, it is a relay which operates to make all the trunks leading to a certain operator's position busy until the call on this trunk is answered. The cord circuit is also provided with an automatic calling device L, which is herein represented by a pair of impulse springs. The release of the apparatus is controlled by the calling subscriber and not by the operator. Associated with the operator's head-set P is a meter-controlling magnet, the function of which is to register the exact number of calls that the operator at any one position receives.

The first selector switch E is of the same general type of selector switch disclosed in United States Letters Patent No. 815,321, granted March 13, 1906, to Keith, Erickson and Erickson, except that the so-called side switch is omitted and the circuits are modified to adapt the switch to operate in a system in which it is controlled by impulses delivered over two sides of the line in series. Among other details, the selector E comprises a bank of contacts arranged in horizontal rows or levels, which contacts are adapted to be engaged by a set of wipers 54, 55 and 56 carried upon a shaft (not shown) which has a vertical movement controlled by the vertical magnet 58 and a rotary movement controlled by a rotary magnet 59. The operations of the various parts of the switch are controlled through the medium of the double-wound line relay 60, which relay is bridged across the trunk conductors through contacts controlled by a switching relay 161. A pair of slow acting relays 65 and 66—that is, relays which deenergize slowly after their energizing circuits are broken—together with a third relay 153, are likewise provided, which relays cooperate in controlling the operation of the switch in a manner to be hereinafter more fully described. The release of the switch is controlled by the release magnet 61, which, upon energizing, withdraws the retaining pawls from the shaft, the circuit of this magnet including the springs 63, which close only when the switch shaft has been raised one or more steps from its lowest position.

The repeater I includes a line relay 68 bridged across the trunk conductors 203 and 205 extending to the repeater from the selector E, this bridge including contact springs controlled by a current-reversing relay 220, which relay is in turn controlled by the double-wound relay 209. This relay 209 is differentially wound and requires the combined strength of both its windings to operatively energize, it being unaffected by either winding alone, or by the two windings working in opposition to each other. The line relay 68 controls the circuit for a pair of slow acting relays 69 and 70. The relay 69 in turn controls the circuit for a third slow acting relay 71, which relay 71 controls the connection of the impedance coil 210 to the trunk conductors 211 and 212 which extend to the selector F. The line relay 68 furthermore controls a bridge across the trunk extending to the selector F in such a manner that when this relay is operated in response to impulse transmitted from the subscriber's station, it opens and closes this bridge to thereby repeat these impulses over the trunk 211 and 212. This repeater furthermore supplies battery current to the calling line and maintains a holding circuit for the selector E without requiring a third conductor to be included in the trunk line extending to the switches beyond, and in this manner the necessity of having three conductor trunks between two offices is eliminated.

The trunk line 211 and 212 extending from the repeater I terminates in a second selector F, which is essentially the same as the selector E, this selector is the means for extending the line connection to the connector in the main exchange similar to the connector H. Associated with the selector F is a relay 72 by means of which connection may be extended to the rotary switch X. The rotary line switch X may be of any suitable type, as for example, of the type shown in French Patent No. 457,000, the function of which switch, as is usual, is to automatically select an idle trunk and then extend the connection over the trunk selected. The switch X, as shown, comprises the wipers 73, 74 and 75, the rotary magnet 76 for rotating the same and the line-switching relay 77 for disconnecting the operating magnets from the calling line after an idle trunk has been selected and to connect the calling line with the before-mentioned wipers.

The connector H is of the same general type of connector switch disclosed in United States Letters Patent No. 815,176, granted March 13, 1906, to Keith, Erickson and Erickson, the circuits, however, being modified to adapt the switch to operate in a system in which the central office apparatus is controlled by impulses delivered over the two sides of the line in series. The connector is provided with a shaft (not shown) carrying the wipers 78, 79 and 80 which is controlled by vertical magnet 81 and the rotary magnet 82. The usual side switch comprising the wipers 83, 84, 85 and 86 is controlled by the private magnet 87 in the usual well-known manner. The magnet 88 is the usual release magnet and the line relay 89 is connected with the calling line through the reversing springs of the so-called back-bridge relay 90. The said back-bridge relay 90 is the means for supplying talking current to the called substation. The ringing relay 91 is the means through which ringing current is applied to the called line. The substation A′ and the line switch C² are similar in all respects to the substation A and the line switch C.

For the purpose of supplying battery current for operating the apparatus and for talking purposes, there are shown the batteries B and B′. Preferably, one battery is located in each exchange. At Q there is shown a busy signaling machine which provides a busy signal, said busy signal being applied to the calling line through the medium of the busy relay 193 in case the called line is in use.

Having given a general description of the apparatus involved in the system, in order to give a complete understanding of my invention I will first describe how the subscriber at substation A may obtain connection with the subscriber at substation A′ in the same exchange. It will be assumed that the number of the latter substation is 220. When the receiver at the substation A is removed from the switch-hook preparatory to making a call, the engagement of the hook-switch springs completes a bridge across the line conductors 93 and 94. The closure of this bridge across the line establishes an energizing circuit for the line relay 14 of the line switch C. The relay 14, upon energizing, operates to close the circuit of the magnet 11, which, upon energizing, attracts the plunger arm 10 and the cut-off armature 15, whereby the line conductors 93 and 94 are extended through the line switch bank springs 16, 20 and 19, 23 to the secondary switch C′, and the line relay 14 is disconnected from the line. The closure of contact between the bank springs 18 and 22 closes a circuit through the relay 30 of the secondary switch C′ and a second circuit through the pull-in winding 104 and the relay 95 associated with said secondary switch. The relay 95, upon energizing, operates to short-circuit its high resistance winding and to connect battery through its low resistance winding to the conductor 103, thence to the pull-in winding 104 of all the secondary line switches C′ controlled by the master switch K. The relay 30, upon energizing, provides a ground for the private conductor 105 through its contact springs 106. The short-circuiting of the high resistance winding of the relay 95 permits sufficient current to flow to cause the pull-in winding 104 of the line switch C′ to energize. This circuit extends from ground $G^2$ through the bank contact springs 18 and 22, pull-in winding 104, springs 101 and 99 of the relay 29, springs 98 and 97 of the group busying relay 110, springs 96 of the relay 95, low resistance winding of said relay, thence through the springs 111 and 112, if the master switch is standing on an idle trunk, to the battery lead 100. The line switch C′ upon operating, closes its bank contact springs and extends the line connection over the trunk conductors 113 and 114 to the line relay 115 of the cord circuit O. The closure of the springs 107 and 109 by the armature 31 closes a holding circuit through the relay 29 and the hold-in winding 116 of the line switch C′ in series. The said last circuit extends from ground $G^2$ through the bank springs 18 and 22, springs 107 and 109, springs 117, relay 29 and the winding 116 to the battery lead 100. The relay 29, upon energizing, disconnects the battery from the pull-in winding 104, and the springs 107 and 108, upon separating, open the circuit of the relay 30, which, upon deenergizing, removes the shunt from around the pull-in winding 104 and places it in series with the relay 29 and the hold-in winding 116. The relay 115 of the cord circuit O, upon energizing, closes a circuit through the relays 121 and 50 in multiple, relay 121 upon energizing, places a ground potential upon the master switch bank contact *a* corresponding to the trunk line that the line switch C′ just seized, and also closes a holding circuit for the line switch C, which in turn holds the line switch C′ in an operated position. The holding circuit for the line switch C extends from ground $G^4$ through the contact of springs 122 and 123, conductor 124, bank contact springs 36, 33 and 21, 17 and the hold-in winding 13 to the battery lead 100. The relay 119 is one of a plurality of similar relays forming a chain of relays, one relay being associated with each trunk leading from the secondary board *n*. The said relay is energized whenever its corresponding trunk line is seized also whenever relay 50 is energized by the seizure of another trunk line, and cooperates with its associate relays to close a circuit through the group busying relay 110 when all trunks leading from said board are busy or when there is an unanswered call at the operator's position. The relay 110, upon energizing, closes a circuit extending from ground $G^2$ through the contact springs 120 and 98, springs 99 and 101 of every non-busy line switch C′ in the group *n* (Fig. 1), pull-in winding 104 and the springs 107 and 108 and the relay 30 of every non-busy line switch to the battery lead 100. The relays 30, upon energizing, close their contact springs 106 and place a guarding ground potential on the private trunk conductor 105 of every trunk leading to said secondary board.

With a master switch of the type shown herein at K, there is a possibility of two calling subscribers initiating a call at practically the same time and obtaining connection over the same secondary trunk to an operator's position. If, when a subscriber at the primary board *m* removes his receiver to thus cause a selection of a trunk extending to the secondary board *n*, it so happened that the master switch K was compelled to move over a plurality of trunk lines before finding an idle one, there would be a small interval of time that the trunks leading to said secondary board would be left unguarded, and in such case it would be possible for a second calling subscriber from some other primary board to seize a trunk line leading to this same secondary board. In this event both secondary line switches would plunge in on the same secondary trunk line when the master switch K came to rest upon an idle trunk line. To obviate this undesirable feature all trunk lines leading to any secondary board from the primary boards are made busy the instant that a call is initiated on any trunk leading to said secondary board. This is accomplished in the following manner: The instant that the primary switch C operates to close contact between its bank springs 18 and 22, a circuit is established through the relays 30 of every non-busy secondary line switch in the group of line switches that are controlled by the master switch K. The relays 30, upon energizing, place a guarding ground upon the private conductors 105 of every trunk leading to said secondary board, thus preventing from seizure all trunks leading thereto. This circuit extends from ground $G^2$ through the contact of springs 18 and 22, pull-in winding 104 of the line switch C′, springs 101 and 99 of the relay 29, common conductor 103, through the springs 101 and 99 of every idle secondary switch in this group, pull-in winding 104, springs 107 and 108 and the relays 30 to the battery lead 100. The relays 30 operate in the same manner as hereinbefore described to make all trunks leading to said secondary board busy. It is, of course, understood that the resistance of this circuit is too high to allow the pull-in windings of the different line switches to become operatively energized.

As previously stated the energization of the line relay 115 of the cord circuit closes a circuit through the group busying relay 50, which, upon energizing, places a guarding ground potential upon the private conductor 124 of every trunk line that leads to this certain operator's position which causes the operation of each of the chain relays $119^a$, $119^b$, $119^c$, etc., of all trunks leading to this position to make this particular operator's position busy until this call has had attention. The circuit for the relay 50 extends from ground $G^6$ through the contact of springs 127, springs 128, springs 129 and the said relay 50 to battery B. The meter-controlling magnet 53 is also energized at this time to register a call upon the meter associated with the operator's head-set. This circuit extends from ground $G^6$ through the springs 127, springs 128, springs 129, springs 135 and 136 and the meter magnet 53 to battery B. A further result of the energization of relay 115 is the bridging of polarized relay 175 across the trunk conductors 137 and 138. This circuit extends from conductor 138 through said relay 175, contacts of springs 186 and its now engaged spring, to conductor 137. The said relay 175 thereupon energizes in series with the line relay 60 of the selector E. The relay 121, besides completing a holding circuit for the line switch C, as hereinbefore mentioned, closes a circuit through the line signal lamp 51. This circuit extends from ground $G^4$ through the contact of springs 130, springs 131 and 132 and the said line signal lamp 51 to battery B. The operator, noticing the line signal lamp 51 glowing, operates the key K′, thereby placing her head-set across the conductors 137 and 138. The springs 128, upon disengaging, open the circuit of the group busying relay 50 and of the meter magnet 53. The relay 50, upon deenergizing, removes the busy test from the idle trunks leading to the operator's position, thus making the position again selectable by other secondary switches. The springs 139, upon engaging, close a circuit through the relay 140, which, upon energizing, closes a locking circuit for itself through the springs 134. A further result of the energization of the relay 140 is the opening of the line signal lamp at the springs 131 and 132 and the closing of a circuit through the relay 141 at the springs 131 and 133. The circuit for the relay 141 extends from ground $G^4$ through the contact of springs 130, springs 131 and 133 and the said relay 141 to battery B. The relay 141, upon energizing, permanently breaks the circuit of the group busying relay 50 at the springs 129, so that when the operator's key K′ is returned to normal the said relay can not again energize. The operator, after inquiring the number desired, operates the key $K^2$, bridging the calling device L across the conductors 142 and 143 connected to the selector switch E, which maintains the line relay 60 energized. The line relay 60, upon energizing as previously stated, closes a circuit through the slow acting relay 66. The energization of the relay 66 prepares a circuit for the vertical magnet by bringing into engagement the springs 144 and 145 and opens the circuit of the release magnet 61 at the springs 145 and 146. The key K′ may now be restored to normal.

It will be assumed that the trunk lines for use in establishing a connection with a subscriber in the same exchange are connected to the second level of contacts in the selector. The first digit of the called number would accordingly be 2. The operator therefore now operates her calling device for the first digit 2 of the called number, whereby the impulse springs $7^a$ and $8^a$ are operated twice momentarily, each time breaking the circuit of the selector line relay 60. The relay 66 of the selector being slow acting does not deenergize during the momentary interruptions of its circuit by the line relay 60 and consequently, each time the latter relay deenergizes, an impulse is transmitted over the circuit extending from ground $G^7$ through the contact of springs 147 and 148, springs 149, springs 145 and 144, relay 65 and the vertical magnet 58 to battery B. The vertical magnet receives two impulses over this circuit and operates to raise the switch shaft and wipers two steps to a position opposite the second row or level of bank contacts. The slow acting relay 65 is maintained in its energized position while impulses are being sent through it to the vertical magnet, and in its energized position closes a circuit extending from ground $G^8$ through the springs 150 and 151 and the relay 153 to battery B. The relay 153, upon energizing, closes a locking circuit for itself extending from ground $G^9$ through the contact of springs 154, rotary magnet springs 155 and 156, offnormal springs 64, springs 159 and 160 of the relay 153 and thence through the relay 153 to battery B. Thus, upon the deenergization of the relay 65 after the last impulse is delivered to the vertical magnet, the relay 153 remains energized and the circuit of the rotary magnet is closed. This circuit extends from ground $G^9$ through the contact of springs 154, springs 155 and 156, off-normal springs 64, springs 159 and 160, springs 151 and 152, interrupter springs 157 and the rotary magnet 59 to battery B. The rotary magnet, upon energizing, rotates the wipers one step and, by opening the springs 156 and 155, disconnects ground $G^9$ from itself and the relay 153. If the first trunk line of the second level is idle, the relay 153 deenergizes as soon as the springs 156 and 155 are opened. If this trunk line is busy, however, the private wiper 55 finds the contact with which it engages provided with a guarding ground potenial which is transmitted to the relay 153 through the springs 159 and 160, thereby preventing it from deenergizing. The rotary magnet, however, deenergizes when the springs 157 disengage, regardless of whether the relay 153 remains energized or not. If the relay 153 remains energized, the circuit of the rotary magnet will be again closed as soon as the armature drops back enough to close the springs 155 and 156. The rotary magnet will, therefore, operate in the manner of a buzzer to advance the wipers step by step over the contacts until the non-grounded contact of an idle trunk line is reached by the wiper 55, whereupon the relay 153 deenergizes. The relay 153, upon deenergizing, whether after one or several operations of the rotary magnet, permanently breaks the circuit of the magnet 59 and closes the circuit of the switching relay 161. The circuit through said switching relay extends from ground $G^9$ through the contact of springs 154, springs 155 and 156, springs 64, springs 159 and 158 and the said relay 161 to battery B. The relay 161, upon energizing, disconnects the line relay 60 from the line and extends the line connections over the heavy conductors through the wipers 54 and 56 to the trunk line 197 and 198, over which connection can be completed to a called subscriber in the same exchange through a connector switch of any well known type, such as the connector H. The relay 89 of the connector thereupon energizes and closes a circuit through the slow acting relay 162. The relay 162, upon energizing, closes a holding circuit for the relay 161 over a circuit extending from ground $g^{10}$ through the contact of springs 163, conductor 164, wiper 55, springs 159 and 158 and through the said relay 161 to battery B. The apparatus is now in readiness for the operation of the dial for the second digit 2.

It will be assumed that the last two digits of the called number are 20. The operation of the calling device for the second digit 2 opens the circuit of the line relay 89 twice. The slow coil 162 does not deenergize during the momentary interruptions by the relay 89, thereby preventing the first selector E from releasing and at the same time the line relay 89 operates to transmit two impulses through the vertical magnet 81. This circuit extends from ground $G^{11}$ through the contact of springs 166 and 165, springs 169 and 168, relay 171, vertical magnet 81 and the side switch wiper 83 (in first position) to the battery B. The vertical magnet 81 receives two impulses over this circuit and operates to raise the switch shaft and wipers opposite the second level of bank contacts. The relay 171 which was included in series with the vertical magnet, remains in its energized position during the entire time that impulses are being sent through it and operates to close the circuit of the private magnet 87. After the last impulse is delivered, the relay 171 opens the circuit of the private magnet 87, which, upon deenergizing, permits the side switch to advance from first to second position. The movement of the side switch wiper 83 from first to second position transfers the battery connection for the vertical magnet 81 to the rotary magnet 82.

The operator now calls the last digit 0, in response to which the connector line relay operates to transmit ten impulses through the rotary magnet 82 in series with the relay 171, whereby the shaft wipers are rotated onto the contacts of the desired line. If the called line is idle, the private magnet 87 deenergizes when its circuit is broken by the relay 171 after the last impulse is delivered to the rotary magnet. The deenergization of the private magnet 87 allows the side switch to advance one more position—that is from second to third position. By the engagement of the side switch wipers 85 and 86 with their third-position contact points, and by the energization of the bridge-cut-off winding 173 of the line switch $C^2$, the connection is completed with the called substation. The circuit for the cut-off winding extends from ground $G^{12}$ through the side switch wiper 84 (in third position) private wiper 79, conductor 174 and the said winding to battery B. A guarding ground potential is supplied to the connector private bank contact of the called line which prevents the called line from being seized by some other connector switch. The operator's key $K^2$ is now restored to normal, thus again bridging the polarized relay 175 across the conductors 142 and 143. The current through the said polarized relay is in the direction to cause the armature 176 to close a circuit through the supervisory lamp 52. By the engagement of the side switch wiper 83 with its third-position contact point, the circuit of the ringing relay 91 is closed. This circuit extends from ground $G^{13}$ through the interrupter 177, relay 91, springs 178 and the side switch wiper 83 to battery B. The ringing relay, upon energizing, discounts the called line from the calling line and bridges the ringing generator R across the called line. The ringing relay is energized only intermittently through the medium of the interrupter 177. Upon the response of the called subscriber his line is provided with talking current through the back-bridge relay 90. The relay 90, upon energizing, closes the circuit of the ringer cut-off relay 179. This circuit extends from ground $G^{12}$ through the side switch wiper 84, contact of the springs 180 and the said relay 179 to battery B. The relay 179, upon energizing, interrupts the circuit of the ringer relay 91 at the springs 178 and closes a locking circuit for itself through the springs 181 independent of the springs 180. A further result of the energization of the back-bridge relay 90 upon the response of the called subscriber is the transposition of the battery connection through the windings of the line relay 89 with regard to conductors 197 and 198. The reversing of the current in the conductors 197 and 198 causes the polarized relay 175 of the cord circuit O to operate its armature to open the circuit of the supervisory lamp 52. The subscriber may now carry on an uninterrupted conversation over the heavy conductors shown.

After the conversation has been completed the apparatus is released in the following manner: The subscriber A, upon replacing his receiver upon the receiver hook, breaks the circuit of the line relay 115 of the cord circuit O at the switch-hook springs 183 and 184. The relay 115, upon deenergizing, opens the circuit of the relay 121 at the springs 185. The relay 121, upon deenergizing, opens the circuit of the hold-in winding 13 of the line switch C at the springs 130. The winding 13 of the line switch, upon deenergizing, allows the plunger arm 10 to return to normal and opens the holding circuit of the secondary line switch C′, which deenergizes and allows its plunger arm 31 to return to normal. A further result due to the deenergization of the relay 121 is the opening of the circuits of the relays 140 and 141 at the springs 130. A still further result due to the deenergizing of the line relay 115 is the opening of the circuit of the polarized relay 175 and the connector line relay 89 at the springs 186. The relay 89, upon deenergizing, opens the circuit of the relay 162. The relay 162, upon deenergizing, opens the holding circuit of the selector E at the springs 163 and closes a circuit through the release magnet 88 of said connector. This latter circuit extends from ground $G^{11}$ through the contact of springs 166 and 165, springs 169 and 170, offnormal springs 187 and the release magnet 88 to battery P. The release magnet, upon energizing, restores the switch shaft and side switch wipers to normal position and its own circuit is broken at the springs 187 when the shaft reaches its lowest position. The relay 161 of the selector E, upon deenergizing, closes a circuit through the selector release magnet 61. This circuit extends from ground $G^{7}$ through the contact of springs 147 and 148, springs 149, springs 145 and 146, offnormal springs 63 and the release magnet 61 to battery B. The release magnet, upon energizing, restores the switch shaft to normal position.

In case a line is already busy when called, the calling subscriber is given a busy signal in the following manner: As has been explained, whenever a line is busy there is a guarding ground potential upon the connector private bank contacts. The connector private wiper, upon engaging this guarding contact, and before the side switch wipers have passed to third position, completes a holding circuit through the private magnet 87, which in turn locks the side switch in second position. This holding circuit extends from ground at the private bank contact, through the wiper 84 (in second position), springs 190 and 189, relay 193, springs 195 and 194 and the magnet 87 to battery B. The private magnet is thus held energized, which maintains the wipers 78 and 80 disconnected from battery and holds the side switch in second position. The relay 193, upon energizing, completes a locking circuit for itself and for the magnet 87 through the springs 189 and 191 independent of ground at the private wiper. The circuit of the rotary magnet 82 is held open at the springs 188 to prevent further rotation of the shaft and wipers. A further result of the energization of the relay 193 is to supply a busy signal to the calling subscriber. This circuit extends from the busy machine Q through the contact of springs 192, side switch wiper 86 (in second position), over the heavy conductor 198, through substation A, over the return conductor 197 and through the upper winding of the relay 89 to battery B.

It will now be explained how a connection may be established between the subscriber A and a called subscriber in a distant exchange. It will be assumed that the third level of the selector banks of selectors E lead to repeaters I which furnish the means for extending the connection to the called subscriber's line in the aforesaid distant exchange. It will be assumed that the number of the called subscriber is 3220. The calling subscriber, upon removing his receiver, will establish connection with the operator at the manual board in the same manner as hereinbefore explained. The operator, upon learning the number desired, bridges her calling device across the conductors 142 and 143 and operates her calling device for the first digit 3, causing the selector E to be raised to the third level, from where it automatically rotates to find an idle trunk line. As soon as the wipers 54, 55 and 56 engage the idle bank contacts 200, 201 and 202, respectively, a circuit is closed through the line relay 68 of the repeater I. The line relay 68, upon energizing, closed a circuit extending from ground $G^{15}$ through the contacts of springs $207^{a}$ and $208^{a}$ and the relay 69 to battery B. The relay 69, upon energizing, presses the springs 206, 207 and 208 into contact, thereby setting up a circuit through the lower winding of the relay 209, which relay does not receive sufficient current to operatively energize. At the same time a holding circuit is completed for the line-switching relay 161 of the selector E. A further result due to the energization of the relay 68 is the bridging of the impedance coil 210 across the trunk conductors 211 and 212, thus energizing the line relay 213 of the selector F. This circuit extends from ground $G^{16}$ through the lower winding of the line relay 213, conductor 212, springs 214, springs 215, springs 216, impedance coil 210, the upper winding of the relay 209, conductor 211 and through the upper winding of the relay 213 to battery E′. The apparatus is now in readiness to receive the second series of impulses, whereby the dial is operated in the usual manner, opening the circuit of the line relay 68 of the repeater I twice momentarily. The slow relay 69 retains its armature in an operated position during the transmission of the impulses. Therefore, each time that the line relay 68 drops back while the slow acting relay 69 is energized, a circuit is completed through the slow relay 71. This circuit extends from ground $G^{15}$ through the springs $207^a$ and $206^a$, springs 218 and the said relay 71 to battery B. The said relay, upon energizing, closes a direct bridge across the conductors 211 and 212, short-circuiting the impedance coil 210. Therefore, each time that the line relay 68 is deenergized, the bridge across the trunk lines 211 and 212 is open and an impulse is transmitted to the selector F. The selector F operates in the same manner that the selector E operates to raise its wipers to the second level of bank contacts and then to rotate and select an idle connector switch (not shown) similar to the connector switch H.

The operator now operates the dial for the last two digits. The line relay 68 of the repeater operates in the same manner as above stated, first to transmit two impulses and then to transmit ten impulses to operate the connector switch to complete the connection with the called subscriber's line. The reversing of the battery upon the conductors 211 and 212 when the called subscriber answers causes the two windings of the relay 209 of the repeater I′ to assist each other to operatively energize said relay. The relay 209, upon energizing, closes a circuit extending from ground $G^{17}$ through the contact of springs 219 and the relay 220 to battery B. The relay 220, upon energizing, reverses the battery on the conductors 203 and 205 and causes the polarized relay 175 of the cord circuit O to operate, as hereinbefore described, to break the circuit of the supervisory lamp 52. The release of the apparatus is initiated by the calling subscriber replacing his receiver upon the switch-hook, which breaks the circuit of the line relay 115 of the cord circuit O, which in turn opens the circuit of the line relay 68 of the repeater I, which in turn opens the circuit of the line relay of the connector switch, thus allowing all the apparatus to return to normal in a manner hereinbefore described.

It very often occurs that it is desirable to have a one-digit number for giving quick service. For example, naught for long distance, fire, police or on recording trunks. This would ordinarily necessitate having extra trunks running from the tenth level of the selector E to the main exchange, which is undesirable. I accomplish the above result in the following manner: The operator will receive the call in the same manner as hereinbefore described and will call 0 upon her calling device, causing the wipers of the selector E to be raised to the tenth level and to then rotate to find an idle trunk line. As soon as the wipers 54, 55 and 56 stop on the idle trunk they engage, for example, the bank contacts 225, 226 and 227 respectively, and an energizing circuit for the relays 70 and 68 is closed extending from ground $G^{18}$ through the lower winding of the relay 68 of the repeater I, conductor 224, wiper 56, over the heavy conductor to and through the calling device L, return heavy conductor, wiper 54, conductor 222, relay 70 and the upper winding of the relay 68 to battery B. The relay 70 energizes and opens up quickly the trunk conductor 212 at the springs 214 before the line relay 213 of the selector F pulls up and places a ground on the conductor 211. Two circuits are thus formed. The first circuit extends from ground $G^{19}$ through contacts of springs 228, conductor 211, back contacts of springs of relay 72 and the switching relay of selector F and the upper winding of line relay 213 to the battery B′. The second circuit extends from ground $G^{19}$ through the contact of springs 228, conductor 211, springs 229 and the right-hand winding of the relay 72 to battery B′, energizing the relay 72. The relay 72 is so constructed and adjusted that it will pull up before the line relay 213 receives sufficient current to energize and thereby open the circuit of said relay 213. The line relay 68 of the repeater I, upon energizing, closes a circuit through the slow acting relay 69. The relay 69, upon energizing, places a holding ground upon the release trunk 223 and places a shunt around the relay 70, which upon deenergizing, removes ground from the trunk conductor 211. The relay 72 associated with the selector F, upon energizing, disconnects the trunk lines 211 and 212 from the selector F and connects them through to the rotary selector X, closing a circuit through the relay 230. The relay 230, upon energizing, closes a locking circuit for the relay 72. This circuit extends from the ground $G^{20}$ through the contact of springs 231, springs 232 and the left-hand winding of the relay 72 to battery B′. If the trunk upon which the wipers 73, 74 and 75 are standing is disengaged, the line-switching relay 77 will energize immediately and connect the calling line with the wipers 73, 74 and 75, which extends the connection over the trunk conductors 300, 301 and 302 to any desired operator or information board, whose cord circuit may be similar to that shown in Fig. 2 or any other well known type. The energizing circuit for the switching relay 77 extends from ground $G^{20}$ through the contact of springs 231, relay 77, springs 238 and 237 and the relay 76 to battery B′. The relay 76 does not operatively energize in series with high resistance relay 77, the switching relay 77, upon energizing, opens the circuit of relay 230 which in turn deenergizes, and opens the initial energizing circuit for relay 77, not however, before a new holding ground has been supplied from the cord circuit in a similar manner to that explained in connection with cord circuit O, Fig. 2. A further result of the energization of relay 77, is the extension of the line circuit to the operator's position. The holding circuit for relay 77 extends from ground over the private wiper 74 through the contact of springs 233 and 304, relay 77, springs 238 and 237 and the relay 76 to battery B′. This holding ground is also extended over the above traced circuit through springs 232 and the left hand winding of the switching relay 72 to battery B′. But if the first trunk line is busy, a circuit is closed through the rotary magnet 76 as soon as the relay 230 energizes. This circuit extends from ground on the private wiper 74 through the contact of springs 233 and 234, springs 236, springs 238 and 237 and the rotary magnet 76 to battery B′. The magnet 76, upon energizing, steps the wipers around one step and interrupts its own circuit at the springs 237 and 238, and if the next contact that the private wiper 74 engages is idle, the switching relay 77 will operate, but if this contact is busy, the rotary magnet will continue to operate and step the wipers around until an idle trunk line is found. The release of the apparatus up to and including the repeater I is the same as hereinbefore described. The release of the apparatus beyond the repeater I is accomplished as follows: When the calling subscriber at A hangs up the receiver, relay 68 of the repeater I deenergizes and at its springs 215 opens the trunk circuit to the operator's position, which causes the holding ground to be removed from the private wiper 74 and therefore from the switching relays 77 and 72. The relays 77 and 72 upon deenergizing, restore the circuit conditions to normal.

From the foregoing it will be seen that I have devised a system in which a plurality of non-numerical switches are used in establishing a connection, and in which as soon as a call is extended to an operator's position all the trunks leading to said operator's position are made busy, and in which the making busy of said trunks does not necessitate the moving of the secondary master switches if they should happen to be standing upon a trunk leading to said operator's position.

Furthermore, it will be seen that I have devised a system in which a plurality of non-numerical switches are used, the primary switches being so arranged that it is not possible for two switches to establish connection with any one trunk under any condition.

Furthermore, I have devised a system in which a regular service trunk may also be used for recording purposes.

Furthermore, it will be seen that I have devised a very efficient system in which connections from different levels of a selector switch can be extended over the same trunk line, and when this connection is extended from one level one automatic switch is brought into operation for extending connection from its trunk line, while when connection is extended through the other level of the selector switch a second automatic switch is brought into operation to extend connection from this trunk line.

While I have illustrated my invention in connection with a semi-automatic telephone system of a particular type, and in which certain types of automatic switches are employed, it is, of course, to be understood that my invention is not limited to use in connection with such systems, but that it is capable of use in connection with many other semi-automatic systems in which various types of automatic switches are employed.

What I claim as my invention:—

1. In a telephone system, a plurality of trunk lines, a plurality of line switches for establishing connection with any one of said trunks, and a reciprocating master switch to which said line switches are normally connected for moving said switches to select an idle trunk when a call is initiated for the subscriber initiating the call.

2. In a telephone system, a plurality of trunk lines, a plurality of line switches normally standing opposite one of said trunks, a reciprocating master switch, and means controlled by said master switch for moving said line switches to an idle trunk if the trunk opposite said line switches is busy when a call is initiated.

3. In a telephone system, a plurality of trunk lines, a plurality of line switches normally standing opposite one of said trunks, a reciprocating master switch to which said line switches are normally connected, and means controlled by said master switch for moving said line switches to an idle trunk if the trunk opposite said line switches is busy when a call is initiated.

4. In a telephone system, a plurality of groups of primary line switches, which line switches are adapted to connect with trunks extending to a plurality of groups of secondary line switches, and a reciprocating master switch for controlling each group of primary line switches to cause said switches to select an idle trunk when a call is initiated for the subscriber initiating the call.

5. In a telephone system, a plurality of groups of primary line switches, which line switches are adapted to connect with trunks extending to a plurality of groups of secondary line switches, a reciprocating master switch for controlling each group of primary line switches to cause said switches to select an idle trunk when a call is initiated for the subscriber initiating the call, and means for preventing a line switch of one group establishing connection with a trunk leading to a secondary switch while the master switch of that group is rotating.

6. In a telephone system, a plurality of line switches, a master switch shaft with which said line switches are normally engaged, a plurality of trunk lines, and means controlled by said master switch shaft for selecting an idle trunk when a call is initiated for the subscriber initiating the call.

7. In a telephone system, a plurality of line switches, a reciprocating master switch shaft with which said line switches are normally engaged, a plurality of trunk lines, and means controlled by said master switch shaft for selecting an idle trunk when a call is initiated for the subscriber initiating the call.

8. In a telephone system, an operator's board, means for distributing calls to said board, said means including a plurality of line switches, a master switch shaft with which said line switches are normally engaged, means for operating said master switch shaft to cause said line switches to select an idle trunk when a call is initiated, and means for preventing a second call being extended to an operator's board when there is an unanswered call on said board.

9. In a telephone system, an automatic switch having bank contacts arranged in a plurality of groups, a trunk line, means for extending connection from a contact in two of said groups over said trunk line, means for extending connection from said trunk over one path beyond it when connection is made with said trunk through a contact in one of said groups immediately upon seizure of said trunk and as a result thereof, and means for extending connection over a second path beyond it when connection is made with said trunk through the contact in the second of said groups immediately upon seizure of said trunk and as a result thereof.

10. In a telephone system, an automatic selector switch provided with bank contacts arranged in a plurality of groups, a repeater, means for extending connection through said repeater from contacts located in a plurality of groups of said bank contacts, and a plurality of automatic switches for extending connection from said repeater, the automatic switch employed being dependent upon the group of contacts in said selector through which connection is extended to said repeater.

11. In a telephone system, an automatic selector switch having bank contacts arranged in a plurality of groups, a trunk line, means for extending connection through said trunk through a contact in either one of two of said groups of selector bank contacts, an automatic switch normally connected to said trunk for extending a connection therefrom when connection is made with said switch through one of said two groups of contacts, a second automatic switch, and means for automatically switching the connection over said trunk to said second automatic switch when connection is made with said trunk through a contact in the second group of selector bank contacts.

12. In a telephone system, a trunk line, means for extending connection to said trunk, via two paths, and means for extending connection from said trunk via two paths, the means employed for extending connection from said trunk being dependent upon the means employed for extending connection to said trunk.

13. In a telephone system, a selector switch having contacts arranged in a plurality of groups, an automatic connector switch, means for extending connection thereto through a contact in one of said groups, a repeater, an automatic selecting switch, means for extending connection through said repeater and selecting switch through a contact from a second group of said bank contacts, and means for extending connection through said repeater and another selecting switch through a contact in a third group of said bank contacts.

14. In a telephone system, a trunk line, a repeater in said trunk, a selecting switch normally connected with said trunk, a second switch normally disconnected therefrom, a selecting switch for extending connection to said repeater through a plurality of paths, and means for switching the connection over said repeater from the normally connected switch to the disconnected switch when connection is made with said repeater through one of said paths.

15. In a telephone system, a plurality of lines, a plurality of trunks for said lines, means individual to each line respectively for connecting the associated line with any idle trunk, means for associating any individual means with an idle trunk and means whereby when an individual means connects a line with an idle trunk, the said second means is made available to any other line for associating its individual means with an idle trunk.

16. In a telephone system, a plurality of lines, a plurality of trunks for said lines, means individual to each line respectively for connecting the associated line with any idle trunk, means for associating any individual means with an idle trunk and means allotted thereto whereby when an individual means connects a line with an idle trunk, the said second means is made available to any other line for associating its individual means with an idle trunk.

17. In a telephone system, a plurality of lines, a plurality of trunks for said lines, means individual to each line for connecting its line with any idle trunk, means for associating said individual means with an idle trunk, and means whereby when a line and an idle trunk are connected the second means is made available to any other line for associating the individual means of said other line with an idle trunk.

18. In a telephone system, a plurality of lines, a plurality of trunks for said lines, means individual to each line respectively for connecting the associated line with any idle trunk, means for associating any individual means with an idle trunk and means whereby when an individual means connects a line with an idle trunk, the said second means is under the control of any other line for associating its individual means with an idle trunk.

19. In a telephone system, a plurality of lines, a plurality of trunks for said lines, means individual to each line respectively for connecting the associated line with any idle trunk, means for associating any individual means with an idle trunk and means whereby when an individual means connects a line with an idle trunk, the said second means is made available to any other line for associating its individual means with an idle trunk, means for releasing the connection and for withdrawing said second means from the control of the other lines.

20. In a telephone system, a plurality of lines, a plurality of trunks for said lines, means individual to each line respectively for connecting its associated line with any idle trunk, means for associating any individual means with an idle trunk and means allotted thereto whereby when an individual means connects a line with an idle trunk, the said second means is made available to any other line for associating its individual means with an idle trunk, means for releasing the connection and for withdrawing said second means from the control of the other lines.

21. In a telephone system, a plurality of lines, a plurality of trunks for said lines, means individual to each line for connecting its line with any idle trunk, means for associating said individual first means with an idle trunk, and means whereby when a line and an idle trunk are connected the said second means is made available to any other line for associating the individual means of said other line with an idle trunk, means for releasing the connection and for withdrawing said second means from the control of the other lines.

22. In a telephone system, a plurality of lines, a plurality of trunks for said lines, means individual to each line respectively for connecting its associated line with any idle trunk, means for associating any individual means with an idle trunk and means whereby when an individual means connects a line with an idle trunk, the said second means is placed under the control of any other line for associating its individual means with an idle trunk, means for releasing the connection and withdrawing said second means from the control of the other lines.

23. In a telephone system, a plurality of lines, a plurality of trunks for said lines, circuit closers for said lines for connecting said lines with any idle trunk, a master switch for associating said circuit closers with an idle trunk, a relay whereby when one of said circuit closers connects a line with an idle trunk the said master switch is made available to any other line for associating the circuit closers with an idle trunk.

24. In a telephone system, a plurality of lines, a plurality of trunks for said lines, circuit closers one for each line for connecting any one of said lines with an idle trunk, a master switch for associating said circuit closers with an idle trunk, a relay whereby when any one of said circuit closers connects its line with an idle trunk, the said master switch is made available to any other line for associating the circuit closer alloted thereto with an idle trunk.

25. In a telephone system, a plurality of lines, a plurality of trunks for said lines, circuit closers one for each line for connecting any one of said lines with an idle trunk, a master switch for associating said circuit closers with an idle trunk, a relay whereby when any one of said circuit closers connects its line with an idle trunk, the said master switch is placed under the control of my other line for associating the circuit closer allotted thereto with an idle trunk.

26. In a telephone system, a plurality of lines, a plurality of trunks for said lines, circuit closers for said lines for connecting said lines with any idle trunk, a master switch for associating said circuit closers with an idle trunk, a relay whereby when one of said circuit closers connects a line with an idle trunk the said master switch is made available to any other line for associating the circuit closers with an idle trunk, a release magnet and a circuit associated therewith for releasing the connection and withdrawing said master switch from the control of the other lines.

27. In a telephone system, a plurality of lines, a plurality of trunks for said lines, circuit closers one for each line for connecting any one of said lines with an idle trunk, a master switch for associating said circuit closers with an idle trunk, a relay whereby when any one of said circuit closers connects its line with an idle trunk, the said master switch is made available to any other line for associating the circuit closer allotted thereto with an idle trunk, a release magnet and a circuit associated therewith for releasing the connection and withdrawing said master switch from the control of the other lines.

28. In a telephone system, a plurality of lines, a plurality of trunks for said lines, circuit closers one for each line for connecting any one of said lines with an idle trunk, a master switch for associating said circuit closers with an idle trunk, a relay whereby when any one of said circuit closers connects its line with an idle trunk, the said master switch is placed under the control of any other line for associating the circuit closer allotted thereto with an idle trunk, a release magnet and a circuit associated therewith for releasing the connection and withdrawing said master switch from the control of the other lines.

29. In a telephone system, a trunk line, a progressively movable trunking switch having access to said trunk, a pair of auxiliary trunks associated with said first trunk, a relay associated with said first trunk, a terminal for said first trunk in said switch, means for operating said switch to seize said trunk and for controlling said relay thereover, said relay operating under the control of said switch to switch said first trunk into connection with either of said auxiliary trunks, said first trunk always normally connected with one of said auxiliary trunks.

30. In a telephone system, a trunk, a pair of sets of terminals for said trunk, a progressively movable trunking switch having access to said terminals for extending a connection to said trunk, a first and a second auxiliary trunk associated with said first trunk, said first trunk normally connected with one of said auxiliary trunks, means for operating said switch to seize one of said sets of terminals to extend a connection from the switch to said first auxiliary trunk and for operating said switch to seize the other one of said sets of terminals to extend a connection from the switch to the first trunk, means for switching the connection to the second auxiliary trunk, and an automatic progressively movable switch in said first auxiliary trunk, said switch rendered inoperative by the switching operation of said last means.

31. In a telephone system, a trunk, a pair of sets of terminals for said trunk, a progressively movable trunking switch having access to said terminals for extending a connection to said trunk, a first and a second auxiliary trunk associated with said first trunk, said first trunk normally connected with one of said auxiliary trunks, means for operating said switch to seize one of said sets of terminals to extend a connection from the switch to said first auxiliary trunk and for operating said switch to seize the other one of said sets of terminals to extend a connection from the switch to the first trunk, means for switching the connection to the second auxiliary trunk, and an automatic progressively movable switch in said first auxiliary trunk, said switch rendered inoperative by the switching operation of said last means, said last means comprising a relay in the talking circuit.

32. In a telephone system, a trunk, a pair of sets of terminals for said trunk, a progressively movable trunking switch having access to said terminals for extending a connection to said trunk, a first and a second auxiliary trunk associated with said first trunk, said first trunk normally connected with one of said auxiliary trunks, means for operating said switch to seize one of said sets of terminals to extend a connection from the switch to said first auxiliary trunk and for operating said switch to seize the other one of said sets of terminals to extend a connection from the switch to the first trunk, means for switching the connection to the second auxiliary trunk, and an automatic progressively movable switch in said first auxiliary trunk, said switch rendered inoperative by the switching operation of said last means, said means comprising a slow-acting relay.

33. In a telephone system a trunk, a pair of sets of terminals for said trunk, a progressively movable trunking switch having access to said terminals for extending a connection to said trunk, a first and a second auxiliary trunk associated with said first trunk, said first trunk normally connected with one of said auxiliary trunks, means for operating said switch to seize one of said sets of terminals to extend a connection from the switch to said first auxiliary trunk and for operating said switch to seize the other one of said sets of terminals to extend a connection from the switch to the first trunk, means for switching the connection to the second auxiliary trunk, said last means comprising a relay, and a locking circuit for said relay controlled over the auxiliary trunk, into connection with which the first trunk is switched.

34. In a telephone system, a trunk having talking conductors, a pair of sets of terminals for said trunk, a progressively movable trunking switch having access to said terminals for extending a connection to said trunk, a first and a second auxiliary trunk associated with said first trunk, said first trunk normally connected with one of said auxiliary trunks, a magnet for operating said switch to seize one of said sets of terminals to extend a connection from the switch to said first auxiliary trunk, said magnet also for operating said switch to seize the other one of said sets of terminals to extend connection from the switch to the first trunk, means for switching the connection to the second auxiliary trunk, said last means comprising a relay, and a locking circuit for said relay controlled over the auxiliary trunk, into connection with which the first trunk is switched.

35. In a telephone system, a trunk, a pair of sets of terminals for said trunk, a progressively movable trunking switch having access to said terminals for extending a connection to said trunks, a first and a second auxiliary trunk associated with said first trunk, said first trunk normally connected with one of said auxiliary trunks, means for operating said switch to seize one of said sets of terminals to extend a connection from the switch to said first auxiliary trunk and for operating said switch to seize the other one of said sets of terminals to extend connection from the switch to the first trunk, means for switching the connection to the second auxiliary trunk, an automatic progressively movable switch in said first auxiliary trunk, said switch rendered inoperative by the switching operation of said last means, said last means comprising a relay, and a locking circuit for said relay controlled over the auxiliary trunk, into connection with which the first trunk is switched.

36. In a telephone system, a trunk, a pair of sets of terminals for said trunk, a progressively movable trunking switch having acceess to said terminals for extending a connection to said trunk, a first and a second auxiliary trunk associated with said first trunk, said first trunk normally connected with one of said auxiliary trunks, means for operating said switch to seize one of said sets of terminals to extend a connection from the switch to said first auxiliary trunk and for operating said switch to seize the other one of said sets of terminals to extend a connection from the switch to the first trunk, and means for switching the connection to the second auxiliary trunk, said relay in series with the talking circuit.

37. In a telephone system, a trunk having talking conductors, a pair of sets of terminals for said trunk, a progressively movable trunking switch having access to said terminals for extending a connection to said trunk, a first and a second auxiliary trunk associated with said first trunk, said first trunk normally connected with one of said auxiliary trunks, a magnet for operating said switch to seize one of said sets of terminals to extend a connection from the switch to said first auxiliary trunk, said magnet also for operating said switch to seize the other one of said sets of terminals to extend connection from the switch to the first trunk, and means for switching the connection to the second auxiliary trunk, said magnet in series with the talking circuit.

38. In a telephone system, a trunk, a pair of sets of terminals for said trunk, a progressively movable trunking switch having access to said terminals for extending a connection to said trunk, a first and a second auxiliary trunk associated with said first trunk, said first trunk normally connected with one of said auxiliary trunks, means for operating said switch to seize one of said sets of terminals to extend a connection from the switch to said first auxiliary trunk and for operating said switch to seize the other one of said sets of terminals to extend a connection from the switch to the first trunk, a relay for switching the connection to the second auxiliary trunk, and an automatic progressively movable switch in said first auxiliary trunk, said switch rendered inoperative by the switching operation of said last means, said relay in series with the talking circuit.

39. In a telephone system, a trunk, a pair of sets of terminals for said trunk, a progressively movable trunking switch having access to said terminals for extending a connection to said trunk, a first and a second auxiliary trunk associated with said first trunk, said first trunk normally connected with one of said auxiliary trunks, means for operating said switch to seize one of said sets of terminals to extend a connection from the switch to said first auxiliary trunk and for operating said switch to seize the other one of said sets of terminals to extend a connection from the switch to the first trunk, and a relay for switching the connection to the second auxiliary trunk, said relay in series with the talking circuit, and means for short circuiting said relay during talking.

40. In a telephone system, a trunk having talking conductors, a pair of sets of terminals for said trunk, a progressively movable trunking switch having access to said terminals for extending a connection to said trunk, a first and a second auxiliary trunk associated with said first trunk, said first trunk normally connected with one of said auxiliary trunks, a magnet for operating said switch to seize one of said sets of terminals to extend a connection from the switch to said first auxiliary trunk, said magnet also for operating said switch to seize the other one of said sets of terminals to extend connection from the switch to the first trunk, a relay for switching the connection to the second auxiliary trunk, said relay in series with the talking circuit, and means for short circuiting said relay during talking.

41. In a telephone system, a trunk, a pair of sets of terminals for said trunk, a progressively movable trunking switch having access to said terminals for extending a connection to said trunk, a first and a second auxiliary trunk associated with said first trunk, said first trunk normally connected with one of said auxiliary trunks, means for operating said switch to seize one of said sets of terminals to extend a connection from the switch to said first auxiliary trunk and for operating said switch to seize the other one of said sets of terminals to extend a connection from the switch to the first trunk, a relay for switching the connection to the second auxiliary trunk, an automatic progressively movable switch in said first auxiliary trunk, said switch rendered inoperative by the switching operation of said last means, said relay in series with the talking circuit, and means for short circuiting said relay during talking.

42. In a telephone system, a plurality of groups of primary line switches, which line switches are adapted to connect with trunks extending to a plurality of groups of secondary line switches, a master switch for controlling each group of primary line switches, each master switch for moving its associated line switches to an idle trunk if the trunk opposite said line switch is busy when a call is initiated, and a similar master switch for controlling each group of secondary line switches.

43. In a telephone system, a plurality of groups of primary line switches, which line switches are adapted to connect with trunks extending to a plurality of groups of secondary line switches, a master switch for controlling each group of primary line switches, each master switch for moving its associated line switches to an idle trunk if the trunk opposite said line switch is busy when a call is initiated, a similar master switch for controlling each group of secondary line switches, and means for making all the trunks leading to a secondary group busy when all the trunks extending from that secondary group are busy.

44. In a telephone system, a plurality of groups of primary line switches, which line switches are adapted to connect with trunks extending to a plurality of groups of secondary line switches, a reciprocating master switch for controlling each group of primary line switches to cause said switches to select an idle trunk when a call is initiated for the subscriber initiating the call, and electromagnetic means for preventing a line switch of one group establishing connection with a trunk leading to a secondary switch while the master switch of that group is rotating.

45. In a telephone system, a plurality of trunk lines, a plurality of line switches normally standing opposite one of said trunks, a reciprocating master switch, and electromagnetic means controlled by said master switch for moving said line switches to an idle trunk if the trunk opposite said line switches is busy when a call is initiated.

46. In a telephone system, an operator's board, means for distributing calls to said board, said means including a plurality of line switches, a master switch shaft with which said line switches are normally engaged, means for operating said master switch shaft to cause said line switches to select an idle trunk when a call is initiated, and electromagnetic means for preventing a second call being extended to an operator's board when there is an unanswered call on said board.

47. In a telephone system, a trunk line, means for extending connection to said trunk via two paths, and means for extending connection from said trunk via two paths, the means employed for extending connection from said trunk being determined by the path selected by the first means for extending connection to said trunk.

48. In a telephone system, a trunk line, a progressively movable trunking switch having access to said trunk, a pair of auxiliary trunks associated with said first trunk, a relay associated with said first trunk, a terminal for said first trunk in said switch, means for operating said switch to seize said trunk and for controlling said relay thereover, said relay operating under the control of said switch to switch said first trunk into connection with one of said auxiliary trunks, said first trunk always normally connected with one of said auxiliary trunks.

49. In a telephone exchange system, a plurality of stations, an incoming line, an outgoing line terminating in said stations, means for interconnecting said lines, means controlled at said interconnecting means for selecting one of said stations, and means for extending said outgoing line beyond the selected station.

50. In a telephone exchange system, a plurality of exchanges, an incoming line, outgoing lines, each of said outgoing lines terminating in a plurality of said exchanges, an automatic switch for interconnecting said incoming line with any of said outgoing lines, and means operative in response to the selection of any outgoing line for extending the selected outgoing line to a desired exchange.

51. In a telephone exchange system, a plurality of exchanges, an incoming line, groups of outgoing lines, each of said outgoing lines terminating in a plurality of exchanges, an automatic switch for interconnecting said incoming line with an idle line of a selected group of outgoing lines, and means selected by said switch in seizing an outgoing line of a desired group for controlling the extension of said outgoing line to one of said exchanges.

52. In a telephone system, an incoming line, an outgoing line, a plurality of stations in which said outgoing line terminates, an automatic switch for interconnecting said incoming and said outgoing lines, means operated in response to the setting of said automatic switch for selecting one of said stations, and means for extending said outgoing line beyond said selected station.

53. In a telephone system, a trunk line having a plurality of incoming branches at one end and a corresponding plurality of outgoing branches at the other end, automatic switching mechanism for extending calls over said trunk line, and cooperating means at opposite ends of said trunk for insuring that each call is routed away from the trunk over the outgoing branch corresponding to the incoming branch in use.

54. In a telephone system, a trunk line, automatic switching mechanism for extending two classes of calls over said trunk line, two branches at the outgoing end of said trunk line, each for the sole use of calls in a particular class, and automatic means for sorting incoming calls according to classes in order to route each call away from said trunk over the branch assigned to the class of calls to which the call belongs.

55. In a telephone system, a trunk line having two branches at one end thereof, means for connecting a calling line with the other end of said trunk line in two different ways, and discriminating means at the junction of said branches for determining over which branch the connection is to be extended in accordance with the way in which the trunk line is connected with at the other end.

56. In a telephone system, a trunk line having two branches at one end thereof, means for connecting a calling line with said trunk line at the other end, and means at the junction of said branches automatically responsive to the establishment of said connection for routing the call over a particular one of said branches.

57. In a telephone system, automatic switches, a trunk line having two branches at one end accessible to said switches, two corresponding branches at the other end of said trunk line, means for operating one of said switches to connect with the trunk line, and means automatically responsive to the completion of the connection for selecting the branch at the distant end of said trunk which corresponds to the particular branch over which the connection is established.

58. In a telephone system, a trunk line having two branches at one end thereof, one of said branches being normally connected and the other normally disconnected, means for connecting with said trunk line at the other end in two different ways, and switching means effective only in case the connection is established in a particular way for connecting the second branch and disconnecting the first.

59. In a telephone system, a repeater, a selector switch for seizing said repeater, said repeater accessible to said selector switch over a number of paths, means for extending said repeater into connection with a plurality of trunk lines, the trunk line to which the repeater is connected during any one connection depending upon the path over which the selector is connected with said repeater.

Signed at Rochester, Monroe Co., New York, this 31st day of August, 1920.

WINFRED T. POWELL.